United States Patent Office 3,157,639
Patented Nov. 17, 1964

3,157,639
SYNTHETIC PENICILLINS
Frank Peter Doyle, Betchworth, Surrey, and John Herbert Charles Nayler, Dorking, Surrey, England, assignors to Beecham Group Limited, Brentford, Middlesex, England, a British company
No Drawing. Filed Aug. 16, 1960, Ser. No. 49,850
Claims priority, application Great Britain, Aug. 19, 1959, 28,377/59
9 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria and, more particularly, relates to novel 6-(2-alkoxy-1-naphthamido) penicillanic acids and nontoxic salts thereof.

Antibacterial agents such as benzylpenicillin have proved highly effective in the past in the therapy of infections due to Gram-positive bacteria but such agents suffer from the serious drawbacks of being unstable in aqueous acid, e.g., upon oral administration, and of being ineffective against numerous so-called resistant strains of bacteria, e.g., penicillin-resistant strains of *Staphylococcus aureus* (*Micrococcus pyogenes* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effective against benzylpenicillin-resistant strains of bacteria or inhibit benzylpenicillinase and thus potentiate the action of benzylpenicillin when admixed therewith and are safe for use in patients who cannot be given benzylpenicillin because they exhibit allergic reactions thereto.

There is provided, according to the present invention, a compound selected from the group consisting of an acid having the formula

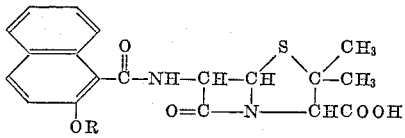

wherein R represents (lower) alkyl, which consists of both straight and branched chain aliphatic hydrocarbon radicals having from one to six carbon atoms such as methyl, ethyl, isopropyl, n-propyl, butyl, isobutyl, t-butyl, amyl and hexyl; and nontoxic salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N, N'-dibenzylethylenediamine, dehydroabietylamine, N,N'-bis-dehydroabietylethylenediamine, N-(lower)alkylpiperidines, e.g., N-ethylpiperidine, and other amines which have been used to form salts with benzylpenicillin. Also included within the scope of the present invention are easily hydrolyzed esters which are converted to the free acid form by chemical or enzymatic hydrolysis.

The products of the present invention are prepared by reaction of 6-aminopenicillanic acid, preferably in the form of a neutral salt such as the sodium salt or the triethylamine salt, with an acid chloride having the formula:

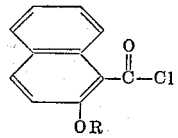

wherein R represents (lower) alkyl or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid.

Since the acid chlorides of the formula set forth above are readily hydrolysed by water, the reaction is preferably carried out in an anhydrous medium. Suitable solvents for the reaction include chloroform, methylene dichloride, and acetone.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature.

At the conclusion of the reaction, the products are isolated, if desired, by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g., 0.373 gm./ml.) in dry n-butanol. The potassium salt forms, precipitates, usually in crystalline form, and is collected by filtration or decantation.

6-aminopenicillanic acid is prepared according to Batchelor et al. (Nature 183, 257–258, January 24, 1959) or Belgian Patent 569,728.

The following examples will serve to illustrate this invention without limiting it thereto.

EXAMPLE 1

*2-Methoxy-1-Naphthylpenicillin (Sodium Salt)*

A solution of 2-methoxy-1-naphthoyl chloride (15.4 g., 0.07 mole) in anhydrous, alcohol-free chloroform (about 160 ml.) was added during about ten minutes to a stirred mixture of 6-aminopenicillanic acid (15.1 g., 0.07 mole), triethylamine (19.6 ml., 0.14 mole) and anhydrous chloroform (about 320 ml.). After stirring for an additional hour, the mixture was shaken with 1 N hydrochloric acid (160 ml.) and the chloroform layer containing the product, 2-methoxy-1-naphthylpenicillin, was separated and washed twice with 160 ml. water. The chloroform solution was then shaken with water (about 160 ml.) and sufficient 3% w./v. sodium bicarbonate solution (about 150 ml.) to give an aqueous phase of pH 7 containing the product as its sodium salt. Evaporation of the aqueous phase under high vacuum at room temperature left a residue which was dried under high vacuum over phosphorus pentoxide to give 22.2 g. sodium 2-methoxy-1-naphthylpenicillin (also called sodium 6-(2-methoxy-1-naphthamido)penicillanate) as a pale yellow powder which inhibited Staph. Oxford at 0.5 mcg./ml., Staph. 1 at 1.25 mcg./ml. and Staph. 2 at 1.25 mcg./ml. Staph. 1 and Staph. 2 are each typical benzylpenicillin-resistant strains, i.e., the minimum inhibitory concentration toward each of them of benzylpenicillin was 50 mcg./ml. The minimum inhibitory concentration toward Staph. 1 and Staph. 2 of 2,6-dimethoxyphenylpenicillin was 2.5 and 5.0 mcg./ml. respectively, and of 2,6-diethoxyphenylpenicillin was 6 and 6 mcg./ml. respectively, and of 2-ethoxy-6-methoxyphenylpenicillin was 2.5 and 5 mcg./ml. respectively.

EXAMPLE 2

2-Methoxy-1-Naphthylpenicillin (a) *Sodium salt.*—Triethylamine (20.4 ml.) was added to a stirred suspension of 6-aminopenicillanic acid (16 g.) in dry alcohol-free chloroform (110 ml.). After being stirred for a further 15 mins. the mixture was cooled to 0° whilst a solution of 2-methoxy-1-naphthoyl chloride (16.3 g.) in chloroform (110 ml.) was added slowly, then stirred at room temperature for 2 hrs., and filtered. The filtrate was cooled to 0° and washed with 1 N. and then with 0.1 N. hydrochloric acid (74 ml. of each), the washings being discarded. The chloroform solution was shaken vigorously with 1 N. aqueous sodium bicarbonate (74 ml., sufficient to give an aqueous layer of pH 6.7–7.0) and then, after separating the layers, with a further 7.4 ml. of the same solution. The two bicarbonate extracts were combined, washed with ether (100 ml.), and evaporated at low temperature and pressure to give the crude sodium salt of 2-methoxy-1-naphthylpenicillin (also called sodium 6-(2-methoxy-1-naphthamido) penicillinate) as a yellow solid (26.3 g.).

A portion (25 g.) was dissolved in water (25 ml.) at 30° and stirred whilst adding n, proponal (225 ml.) at the same temperature. Slow cooling to 0° gave the crystalline penicillin which, after a second similar crystallisation, formed colourless needles, M.P. 180–185° (decomp.), $[\alpha]_D^{22} = +204°$ (c, 5.0 in water). (Found: C, 53.6; H, 4.9; N, 6.2; S, 7.4; Na, 5.2; $H_2O$, 6.1. $C_{20}H_{19}N_2O_5SNa$, 1.5 $H_2O$ requires C, 53.5; H, 4.9; N, 6.2; S, 7.1; Na, 5.1; $H_2O$, 6.0%).

(b) *N,N'-dibenzylethylenediamine salt.*—Concentrated aqueous solutions of the sodium salt (1.08 g.) and of N, N'-dibenzylethylenediamine diacetate (0.46 g.) were mixed to give an oily precipitate which quickly crystallised. The dibenzylethylene diamine salt was collected, washed with water, dried, and recrystallised from hot ethanol (30 ml.) to give crystals of the trihydrate, M.P. 132–133° (decomp.). (Found: C, 61.1; H, 6.5; N, 7.8; S, 5.5. $C_{56}H_{60}N_6O_{10}S_2$, $3H_2O$ requires C, 61.4; H, 6.1; N, 7.7; S, 5.8%).

EXAMPLE 3

2-Ethoxy-1-Naphthylpenicillin (Sodium Salt)

A stirred suspension of 6-aminopenicillanic acid (12.6 g.) in dry alcohol-free chloroform (130 ml.) was treated with triethylamine (16 ml.) and then with a solution of 2-ethoxy-1-naphthoyl chloride (13.8 g.) in chloroform (95 ml.) as described in Example 2. After being washed successively with N. and then 0.1 N. hydrochloric acid (58 ml. of each) the chloroform solution was extracted with N. aqueous sodium bicarbonate (58 ml.+6 ml.). The combined bicarbonate extracts were washed with ether (20 ml.) and then evaporated at low temperature and pressure to give the crude sodium salt of 2-ethoxy-1-naphthylpenicillin (also called sodium 6-(2-ethoxy-1-naphthamido) penicillinate) as a yellow powder (20.3 g.). This was dissolved in water (20 ml.) at 30° and diluted with *n*.butanol (180 ml.), also at 30°, with stirring. Slow cooling to 0° gave colourless needles of the penicillin (Found: N, 6.0; S, 6.7; Na, 4.8; $H_2O$, 3.8.

$$C_{21}H_{21}N_2O_5SNa$$

$H_2O$ requires N, 6.2; S, 7.1; Na, 5.1; $H_2O$, 4.0%).

EXAMPLE 4

2-n-Propoxy-1-Naphthylpenicillin (Sodium Salt)

A solution of 2-n-propoxy-1-naphthoyl chloride (9.9 g.) in dry alcohol-free chloroform (50 ml.) was added dropwise during 20 mins. to a stirred mixture of 6-aminopenicillanic acid (8.64 g.), triethylamine (11.2 ml.) and dry alcohol-free chloroform (100 ml.). After stirring for 1 hr. the solution was washed with water (20 ml.) plus 1 N. hydrochloric acid (40 ml., sufficient to give an aqueous phase of pH 2) and then the chloroform phase was extracted with water (20 ml.) plus 3% w.-v. aqueous sodium bicarbonate (112 ml., sufficient to give an aqueous phase of pH 7). The bicarbonate extract was washed with ether (1 x 100 ml.) and evaporated at low temperature and pressure to give the crude product as a pale yellow powder (16 g.).

A portion (2 g.) was dissolved in anhydrous acetone (30 ml.) and the solution was clarified by filtration, then re-evaporated. The residual gum was triturated with anhydrous ether and the solid so produced was dissolved in n-propanol/water (19:1., 14 ml.). Very slight cooling of this solution gave the sodium salt of 2-n-propoxy-1-naphthyl penicillin (also called sodium 6-(2-n-propoxy-1-naphthamido)penicillanate) as white micro-needles. Found: C, 58.4; H, 5.3; O, 7.1. $C_{22}H_{23}N_2O_5SNa$ requires C, 58.7; H, 5.1; S, 7.1%).

The parent acid (55%) M.P. 88–89° was obtained by oxidation of 2-n-propoxy-1-naphthaldehyde with alkaline potassium permanganate in aqueous acetone. The 2-n-propoxy-1-naphthaldehyde (74%) M.P. 63–64° was obtained by treatment of 2-hydroxy-1-naphthaldehyde in boiling acetone with n-propyl iodide for 48 hours.

EXAMPLE 5

2-n-Butoxy-1-Naphthylpenicillin (Sodium Salt)

A solution of 2-n-butoxy-1-naphthoyl chloride (5.25 g.) in dry alcohol-free chloroform (25 ml.) was added dropwise during 20 mins. to a stirred mixture of 6-aminopenicillanic acid (4.32 g.), triethylamine (5.6 ml.) and dry alcohol-free chloroform (50 ml.). After stirring for a further 1 hr., the solution was washed with water (10 ml.) plus 1 N. hydrochloric acid (20 ml., sufficient to give an aqueous phase of pH 2) and the chloroform layer then extracted with water (20 ml.) and 3% w./v. aqueous sodium bicarbonate (56 ml., sufficient to give an aqueous phase of pH 7). The bicarbonate extract was washed with ether (1 x 50 ml.) and evaporated at low temperature and pressure to give the crude product, the sodium salt of 2-n-butoxy-1-naphthylpenicillin (also called sodium 6-(2-n-butoxy-1-naphthamido) penicillanate), as a pale yellow powder (5.32 g.).

The parent acid (64%) M.P. 92–94° was obtained by oxidation of 2-n-butoxy-1-naphthaldehyde with alkaline potassium permanganate in aqueous acetone. The 2-n-butoxy-1-naphthaldehyde (59%) M.P. 59–61° was obtained by treatment of 2-hydroxy-1-naphthaldehyde with n-butyl bromide in boiling acetone for 48 hours.

EXAMPLE 6

2-Isopropoxy-1-Naphthylpenicillin (Sodium Salt)

A solution of 2-isopropoxy-1-naphthoyl chloride (5.0 g.) in dry alcohol-free chloroform (25 ml.) was added dropwise during 20 mins., to a stirred mixture of 6-aminopenicillanic acid (4.32 g.), triethylamine (5.6 ml.) and dry alcohol-free chloroform (50 ml.). After stirring for a further 1 hr., the solution was washed with water (10 ml.) plus 1 N. hydrochloric acid (20 ml., sufficient to give an aqueous phase of pH 2) and the chloroform layer then extracted with water (20 ml.) and 3% w./v. aqueous sodium bicarbonate (56 ml., sufficient to give an aqueous phase of pH 7). The bicarbonate extract was washed with ether (1 x 50 ml.), and evaporated at low temperature and pressure to give the crude product the sodium salt of 2-iso-propoxy-1-naphthylpenicillin as a pale yellow product (7 g.)

The parent acid (65%) M.P. 153–154° was obtained by oxidation of 2-iso-propoxy-1-naphthaldehyde with alkaline potassium permanganate in aqueous acetone. The 2-iso-propoxy-1-naphthaldehyde (26%) M.P. 66–68° was obtained by treatment of 2-hydroxy-1-naphthaldehyde with isopropoxy bromide in boiling acetone for 26 hours.

Antibacterial Activity

The minimum inhibitory concentration (M.I.C) in mcg./ml. as measured by serial dilution in agar versus three organisms of four of the compounds of the examples above was as follows:

| Compound | M.I.C. versus— | | |
|---|---|---|---|
| | Oxford Staph. | Staph. pyogenes [1] | Staph. pyogenes [1] |
| Ex. 1 | 0.5 | 1.25 | 1.25 |
| Ex. 3 | 0.25 | 0.6 | 0.6 |
| Ex. 4 | 0.25 | 1.25 | 1.25 |
| Ex. 5 | 0.25 | 0.5 | 1.25 |

[1] Benzylpencillin- resistant.

While in the foregoing specification various embodiments of this invention have been set forth and specific details thereof elaborated for the purpose of illustration, it will be apparent to those skilled in the art that this invention is susceptible to other embodiments and that many of these details may be varied widely without departing from the basic concept and spirit of the invention.

We claim:
1. A compound selected from the group consisting of an acid having the formula:

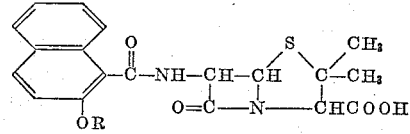

wherein R represents (lower)alkyl; and its nontoxic pharmaceutically acceptable salts.
2. 6-(2-methoxy-1-naphthamido)penicillanic acid.
3. 6-(2-ethoxy-1-naphthamido)penicillanic acid.
4. 6-(2-n-propoxy-1-naphthamido)penicillanic acid.
5. 6-(2-n-butoxy-1-naphthamido)penicillanic acid.
6. Sodium 6-(2-methoxy-1-naphthamido)penicillanate.
7. Potassium 6-(2-methoxy-1-naphthamido)penicillanate.
8. Dibenzylamine 6 - (2-methoxy-1-naphthamido)penicillanate.
9. A compound of the formula

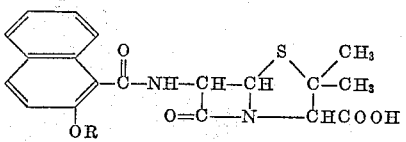

wherein R represents lower alkyl.

References Cited in the file of this patent
UNITED STATES PATENTS
2,479,297    Behrens et al. _____ Aug. 16, 1949
2,941,955    Doyle et al. _____ June 21, 1960

FOREIGN PATENTS
569,728    Belgium _____ Nov. 15, 1958